(12) United States Patent
Seeger, Jr. et al.

(10) Patent No.: US 9,697,571 B2
(45) Date of Patent: Jul. 4, 2017

(54) REAL-TIME FILE SYSTEM CHARGE-BACK ACCOUNTING PER MANAGEMENT OBJECT DURING A REPORT CYCLE

(75) Inventors: James John Seeger, Jr., Portland, OR (US); Jason Christopher Young, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 12/904,291

(22) Filed: Oct. 14, 2010

(65) Prior Publication Data
US 2011/0029419 A1    Feb. 3, 2011

Related U.S. Application Data

(62) Division of application No. 11/294,165, filed on Dec. 5, 2005.

(51) Int. Cl.
G06Q 10/00    (2012.01)
G06Q 40/00    (2012.01)

(52) U.S. Cl.
CPC .................................. *G06Q 40/12* (2013.12)

(58) Field of Classification Search
CPC .................................................... G06Q 40/12
USPC ........................................................ 707/693
See application file for complete search history.

(56) References Cited

U.S. PATENT DOCUMENTS

| | | | |
|---|---|---|---|
| 4,528,624 A * | 7/1985 | Kamionka et al. | 718/104 |
| 5,499,354 A * | 3/1996 | Aschoff et al. | 711/129 |
| 7,225,211 B1 * | 5/2007 | Colgrove et al. | 707/693 |
| 7,243,094 B2 * | 7/2007 | Tabellion et al. | |
| 2002/0016871 A1 * | 2/2002 | Graf | 710/5 |
| 2003/0036974 A1 * | 2/2003 | Allen | 705/27 |
| 2003/0061362 A1 * | 3/2003 | Qiu et al. | 709/229 |
| 2003/0065617 A1 * | 4/2003 | Watkins et al. | 705/40 |
| 2003/0110190 A1 | 6/2003 | Achiwa et al. | |
| 2003/0115118 A1 | 6/2003 | Reinemann | |
| 2003/0187853 A1 * | 10/2003 | Hensley et al. | 707/10 |
| 2004/0059758 A1 * | 3/2004 | Faiman et al. | 707/205 |
| 2004/0098383 A1 | 5/2004 | Tabellion et al. | |
| 2004/0111308 A1 * | 6/2004 | Yakov | 705/8 |
| 2004/0193879 A1 * | 9/2004 | Sonoda et al. | 713/165 |

(Continued)

FOREIGN PATENT DOCUMENTS

| | | |
|---|---|---|
| JP | 2002073383 | 3/2002 |
| JP | 2005050007 | 2/2005 |

*Primary Examiner* — Maria C Santos-Diaz
(74) *Attorney, Agent, or Firm* — Lieberman & Brandsdorfer, LLC

(57) ABSTRACT

A method, apparatus and program storage device for providing real-time file system charge-back accounting with real time historical minimum and maximum usage per user or group during a report cycle. In a first storage area of file system memory, space allocation data for a current accounting period is monitored and persistently maintained. A minimum, maximum and average space allocation is calculated for the management object during the current accounting period. The calculated minimum, maximum and average space allocation for the management object may be moved to a second storage area of the file system memory while beginning to monitor and persistently maintain space allocation data of the management object in the first storage area of the file system memory during a subsequent accounting period.

13 Claims, 9 Drawing Sheets

(56) References Cited

U.S. PATENT DOCUMENTS

2005/0125593 A1    6/2005  Karpoff et al.
2005/0144025 A1*   6/2005  Katz et al. .................... 705/1
2005/0144283 A1*   6/2005  Fatula, Jr. ................... 709/226
2006/0031842 A1*   2/2006  Neiman et al. ............... 718/103
2008/0294648 A1*  11/2008  Lin et al. .................... 707/10

* cited by examiner

REAL-TIME FILE SYSTEM CHARGE-BACK ACCOUNTING PER MANAGEMENT OBJECT DURING A REPORT CYCLE

CROSS REFERENCE TO RELATED APPLICATION(S)

This application is a division of application Ser. No. 11/294,165, filed Dec. 5, 2005, now pending, which is hereby incorporated herein by reference.

BACKGROUND OF THE INVENTION

1. Field of the Invention

This invention relates in general to a storage system accounting, and more particularly to a method, apparatus and program storage device for providing real-time file system charge-back accounting with real time historical minimum and maximum usage per user or group during a report cycle.

2. Description of Related Art

In today's information age, computer and communication systems often require large amounts of data storage. More and more frequently, access to data storage is being provided over communication networks. Among other things, this makes data storage resources available to a number of data storage users.

Storage infrastructures of enterprises are feeling a strain as the huge demand for storage continues to rapidly increase. Escalating capacity and bandwidth requirements cause costs to soar as resource-constrained organizations struggle to manage the complexity and sheer volume of data that must be stored, accessed, and protected.

The increase in average file size (text-based to multimedia) continues to grow. New applications are driving storage capacity upward and introducing new types of data. At the same time, Internet access devices, such as mobile phones and Personal Digital Assistants (PDAs), are getting smaller with less processing power, less storage, and smaller screen sizes. This trend implies that more content will have to be processed and stored rather than within the access device itself.

Most businesses today are faced with high growth in the amount of data they have to store, but IT budgets are flat, or being reduced. IT can no longer afford to keep all their data on high-end storage platforms or staffing levels to manage large numbers of storage targets. The answer is to produce a small set of storage tiers that align with business requirements to provide the optimum service level at the lowest cost. Tiered Storage School will help in understanding which technologies are available for implementing a tiered storage strategy.

Information Lifecycle Management (ILM) is a process that includes Information Technology (IT) staff making decisions about what data should reside where in the physical infrastructure. ILM is a process in which people, processes, and technologies deal with data from cradle to grave. Data has different value at inception than it does at death, so it shouldn't be treated the same way during each phase of its lifetime.

However, a distinction may be made between Data Lifecycle Management (DLM) and ILM. DLM is the infrastructural element and ILM is the macro-level element that assigns both subjective and objective value. ILM relates not only to an application, but also to where the information itself resides in the company as a whole. DLM, which involves the infrastructural component of what goes where and when, is very similar to the traditional Hierarchical Storage Management (HSM) that has existed in the mainframe world since inception. The primary difference is that HSM is a single-server, single storage stack methodology for moving data down the physical stack in order to lower the cost of primary storage, whereas DLM architectures automate the processes involved, typically organizing data into separate tiers according to specified policies, and automating data migration from one tier to another based on those criteria. DLM includes two tiers. There is the physical tier of actual storage where data resides, including disk arrays of all sizes and tapes, and then there is the process tier for moving data between those elements.

Companies today are constructing tiered storage infrastructures. These companies continue to deploy storage systems that deliver many different classes of storage ranging from high performance/high cost to high capacity/low cost. Through the deployment of SANs, many of these storage assets are now physically connected to servers that run many different types of applications and create many kinds of information. Finally, with the arrival of network-resident storage services for distributed management of volume, files, and data replication managers can intelligently manage storage assets to meet the needs of many different applications across the network instead of device by device.

Accordingly, the growing importance of data as a corporate asset puts increasing pressure on organizations to protect and manage storage to ensure its continuous availability. As sites are faced with deploying larger and more complex storage infrastructure, storage management costs compound quickly and technology planning becomes riskier. Moreover, the rapid evolution of technology mandates training of specialized personnel to maximize performance gains and ensure compatibility with emerging standards.

Because of these factors, it is important that today's accounting process measure and assign resource and service utilization accurately. An effective way to measure, report, and charge for the operational costs and services is to integrate the accounting process with the measurement system. As a result, the role of accounting has expanded from capacity planning, resource utilization, and performance monitoring to one of measuring and charging operational costs for technical resources and end user services provided by data center. Accounting process must gather accounting information from different sources. The accounting process needs to be closely linked with both the Service Level Agreements (SLA) and the reporting process to successfully manage and charge storage related costs.

With data processing, each department and every project produces costs. The goal of the accounting and chargeback system is to identify total costs for each cost categories, what caused the costs, who caused the costs, how to distribute the cost and who to bill. An essential requirement of the accounting and chargeback system is to accurately identify all costs, measure the usage and correctly distribute the costs. All resources and services must be analyzed to determine who is consuming the resource or service and what costs are associated with the resource or service so the cost can be charged. This process is not simple, and requires detailed knowledge of the systems to recognize the correct data and correctly associate the data in the accounting and chargeback system.

The main purpose of an accounting system is chargeback. Chargeback is when the cost of services provided are identified and charged to the users and recipients of the services. Without charging for the services, the process of accounting for services is of little value. The accounting system is used to discover resource usage and assign the various resource usages to different causes. By assigning a value to each resource usage, a chargeback system is developed.

File system chargeback accounting is point-in-time in nature with today's file systems. Normally the functionality is tied to a file system's user or group quota and some independent reporting utility. The space reported is generated from the current quota accounting within the file system via some customized scripting. The major drawback is space utilization can dynamically change, sometimes significantly, during a reporting cycle. There is no way to determine that a user has potentially large cyclic space usage. Additionally, some quota implementations only report the used disk space and do not consider allocated space.

Another solution that exists in some space reporting tools today is a sampling method which estimates the amount of space used by a user or application. The problem with this approach is the sample period can be very costly and time consuming. Additionally, the results are only an estimation of the space utilization. Additionally, this type of method can only categorize file systems and applications it knows about. New file systems or application support in a customer environment would need to be added. Some SAN providers provide chargeback at a logical LUN granularity, but not at a file system user or group granularity.

It can be seen then that there is a need for a method, apparatus and program storage device for providing file system chargeback accounting with real time historical minimum and maximum usage per management object, e.g., user or group, during a report cycle.

SUMMARY OF THE INVENTION

To overcome the limitations in the prior art described above, and to overcome other limitations that will become apparent upon reading and understanding the present specification, the present invention discloses a method, apparatus and program storage device for providing real-time file system charge-back accounting with real time historical minimum and maximum usage per management object during a report cycle.

The present invention solves the above-described problems by providing an arrangement for storing space allocation data for users in file system memory. This allows an administrator to define a charge-back accounting cycle. Once a new accounting cycle is defined, the minimum and maximum space utilized by each user is maintained for reporting until the next accounting cycle. An average space utilization value may be calculated, e.g., mean, weighted average, etc, to allow generation of charge-back accounting. The charge-back data is maintained real time with file system activity to provide a more accurate space utilization report. The space allocation data is persistently maintained during a first accounting period in a first file system buffer and then moved to a second file system buffer at the end of the current accounting period. This move may be physical or logical.

A file system for providing charge back accounting data in accordance with the principles of the present invention includes a first file system buffer for persistently maintaining space allocation data during a current accounting period, wherein the space allocation data comprises a minimum, a maximum and an average space allocation for a management object during the current accounting period.

In an embodiment of the present invention implemented as a storage system, an accounting system is provided that uses the file system charge back accounting data to generate a report describing storage space allocation by a management object, e.g., a user or a group. The file system for providing charge back accounting data includes a first file system buffer for persistently maintaining space allocation data during a current accounting period, the space allocation data comprising a minimum, a maximum and an average space allocation for a management object during the current accounting period. Embodiments implementing a method, a service and a program storage device that includes program instructions executable by a processing device to perform operations for providing file system charge back accounting data are also described.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing real-time file system charge-back accounting with real time historical minimum and maximum usage per management object, e.g., user or group, during a report cycle. An arrangement is provided for storing space allocation data for users in file system memory. This allows an administrator to define a charge-back accounting cycle. Once a new accounting cycle is defined, the minimum and maximum space utilized by each user is maintained for reporting until the next accounting cycle. An average space utilization value may be calculated, e.g., mean, weighted average, etc, to allow generation of charge-back accounting. The charge-back data is maintained real time with file system activity to provide a more accurate space utilization report.

Figure 1:
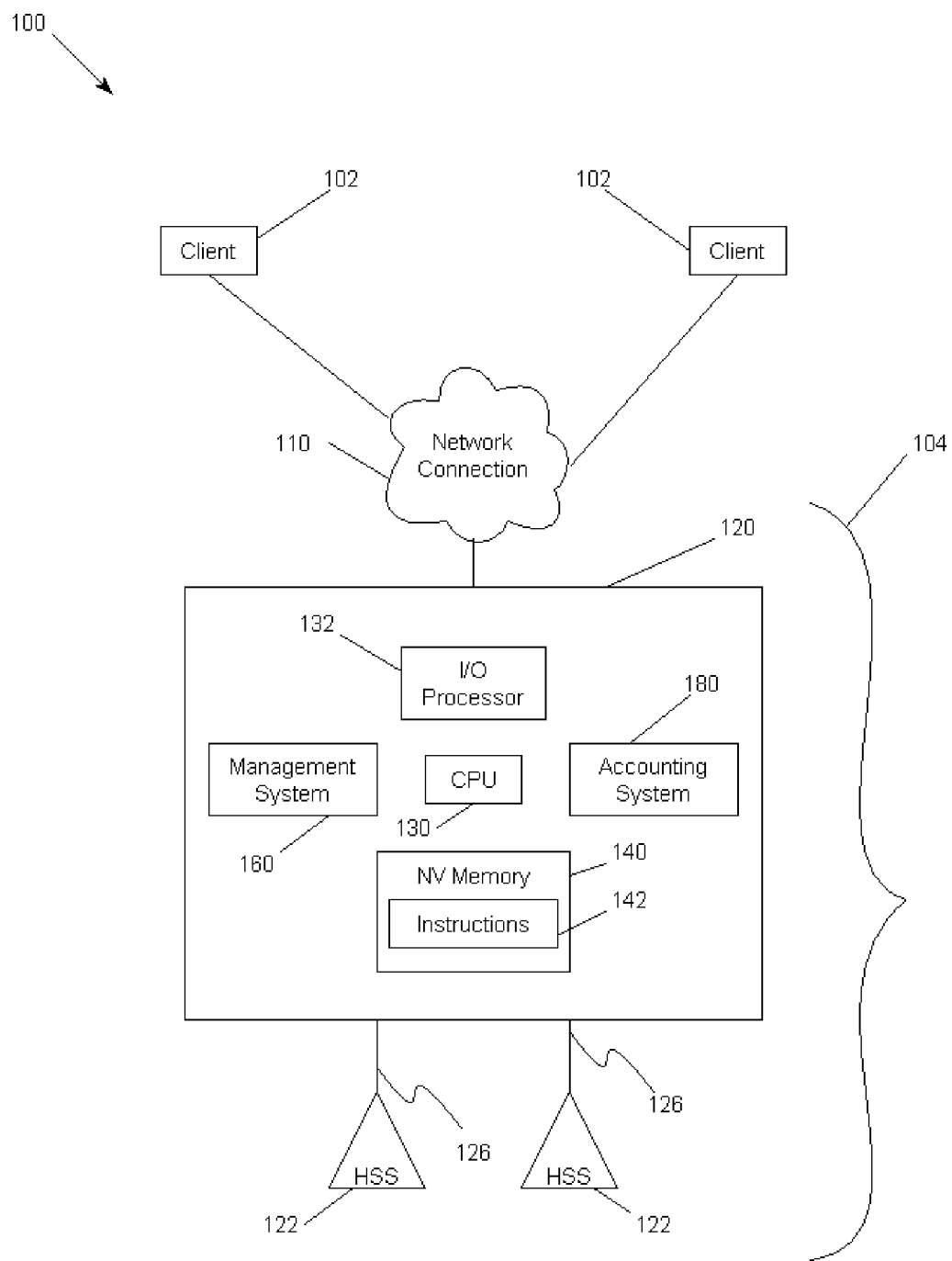
FIG. 1 illustrates a block diagram of a hierarchical data storage management system according to one embodiment of the present invention.

FIG. 1 illustrates a block diagram of a hierarchical data storage management system 100 according to one embodiment of the present invention. The system 100 generally includes a hierarchical data storage subsystem 104 that is accessible by clients 102. The client stations 102 may be local or remote relative to the data processing apparatus 120 and generally access the data processing apparatus 120 via a network 110. The hierarchical data storage subsystem 104 is configured to store data and manage the stored data according to storage access requests from user client stations 102. The depicted storage subsystem 104 includes a data processing apparatus 120 operationally coupled to one or more hierarchical data storage units 122 via a communications channel 126. The communications channel 126 may be a storage area network (SAN) or alternately may be another type of communications channel.

The data processing apparatus 120 includes a central processing unit 130 for processing the digital signals received from client stations 102. The central processing unit 130 is coupled with an I/O processor 132. The central processing unit 130 transmits signals to the hierarchical data storage units 122 and database 124 via the I/O processor 132 and communications channel 126. The central processing unit 130 is also digitally coupled to memory storage 140 for storing programming instructions 142 accessed by the central processing unit 130 for control of the digital processing system 120.

The data processing apparatus 120 also includes a storage management system 160 and an accounting system 180. The management system 160 monitors usage of all devices and outputs information indicative of such use in a common format. In general, the management system can provide data for a variety of different applications, aside from the billing application illustrated here. The accounting system 180 creates and stores usage information. Accordingly, the accounting system 180 bills each customer based on a calculation as will be described herein below. Accounting system 180 executes an accounting process that collects performance status to derive resource utilization of the hierarchical data storage units 122. The collected performance status is maintained persistently in a dual buffer system as described herein below.

Figure 2:
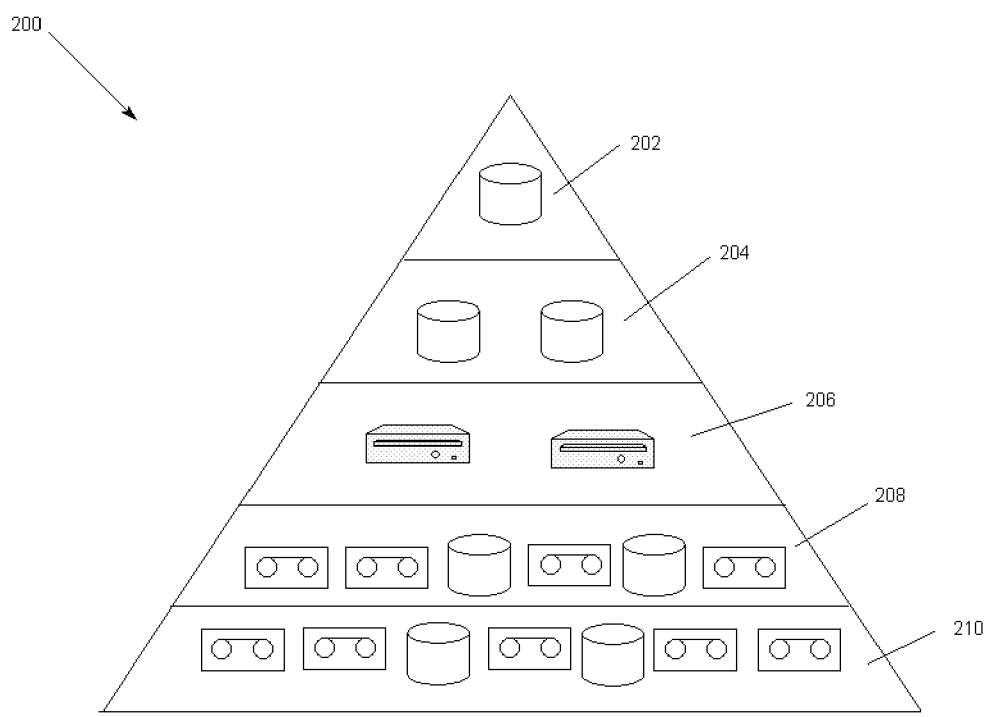
FIG. 2 represents a data storage hierarchy according to an embodiment of the present invention.

FIG. 2 represents a data storage hierarchy 200 according to an embodiment of the present invention. In FIG. 2, diagrammatically "higher" data storage media and devices correspond to faster accessibility to stored data, disaster recovery and nearline restore capabilities. Specifically, this depiction includes high-speed data storage media and devices at the "top" levels 202 and 204 of the hierarchy 200. For example, level 202 might include a direct access storage device (DASD) such as a high-speed magnetic disk drive or high-speed optical disks and drives. Level 204 might include storage media and devices similar to those in level 202, but of slower access speeds.

In FIG. 2, level 206 includes multiple optical disks and one or more corresponding optical disk drives. Once again, these storage media devices represent access times slower than the devices depicted in levels 202 and 204. Levels 208 and 210 represent the slowest access times for all of the media types and devices shown in the depicted storage hierarchy 200. These levels 208 and 210 might include sequential access storage devices such as magnetic tape media and drives.

The storage hierarchy 200 illustrated in FIG. 2 is also very helpful to illustrate one example of a cost structure for various media types and devices within the storage hierarchy 200. For example, the "bottom" levels 210 and 208 of the diagram may represent the least costly storage implementation per data unit while the "top" levels 202 and 204 may represent the most costly data storage schemes. From this it is apparent and not unexpected that the storage media devices that offer the fastest data access times are also typically the most expensive to implement for a given amount of data storage capacity.

Thus, a client with very stringent performance or recovery requirements in need of the absolutely fastest data retrieval available would not be satisfied with the implementation of a system consisting solely of currently available magnetic tapes and drives. Instead, such a client would desire access to direct access storage devices or other more costly storage resources for all data storage within the projected data storage capacity requirements and project funding constraints. Moreover, a user on a client may have files that exist in one, some or all of the storage tiers.

Another aspect of the storage hierarchy 200 is the designation and use of storage pools. A storage pool is one or more storage media, such as disks and tapes, that are assigned as a group by the hierarchical storage manager for storage of similar data. The assignment may be automatically executed based on storage policy or may be manually dictated by a user via an administrator station. A typical storage pool may correspond to a particular type of data as illustrated in FIG. 3.

Figure 3:
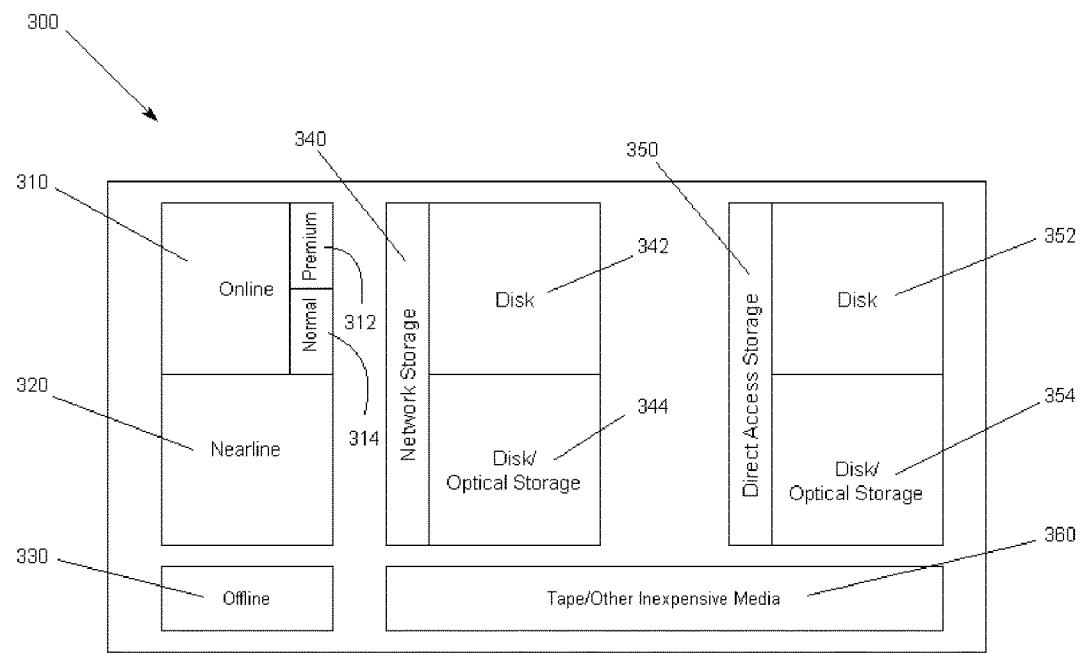
FIG. 3 illustrates a three-tiered storage model according to one embodiment of the present invention.

FIG. 3 illustrates a three-tiered storage model 300 according to one embodiment of the present invention. Data that is stored in a tiered or hierarchical storage system may be classified according to storage classes, which may be hierarchical attributes provided for each storage region based on the usage of data storage. For example, a three-tiered storage system 300 may be utilized, wherein the three attributes of online storage 310, nearline storage 320 and archive storage 330 are used. In addition, sub-attributes, such as premium 312 and normal 314 storage may be defined for the online storage.

Online storage 310 may be an attribute set for logical units (LUs) suitable for storing data of files that are frequently accessed, such as files being accessed online and files being generated. The premium sub-attribute 312 may indicate an attribute set for LUs suitable for storing data especially requiring fast response or more desirable recovery capabilities. Nearline storage 320 may be an attribute set for LUs suitable for storing data of files that are not frequently used but are occasionally accessed. Archive storage 330 may be an attribute set for LUs suitable for storing data of files that are hardly ever accessed and are maintained for long-term storage.

As can be seen in FIG. 3, the online 310 and nearline storage 320 may be implemented using network storage 340 and/or direct access storage 350. The network storage may further be implemented, for example, using disks 342 for the online storage 310 and disk and/or optical storage devices 344 for the nearline storage 320. Similarly, the direct access storage may further be implemented, for example, using disks 352 for the online storage 310 and disk and/or optical storage devices 354 for the nearline storage 320. As shown in FIG. 3, the offline storage 330 may be implemented using tape or other inexpensive storage devices 360.

While FIG. 3 shows a three-tiered storage model, those skilled in the art will recognize that embodiments of the present invention are not meant to be limited to a three-tiered model and that other models may be utilized in a manner that is consistent with the embodiments of the present invention described herein.

Figure 4:
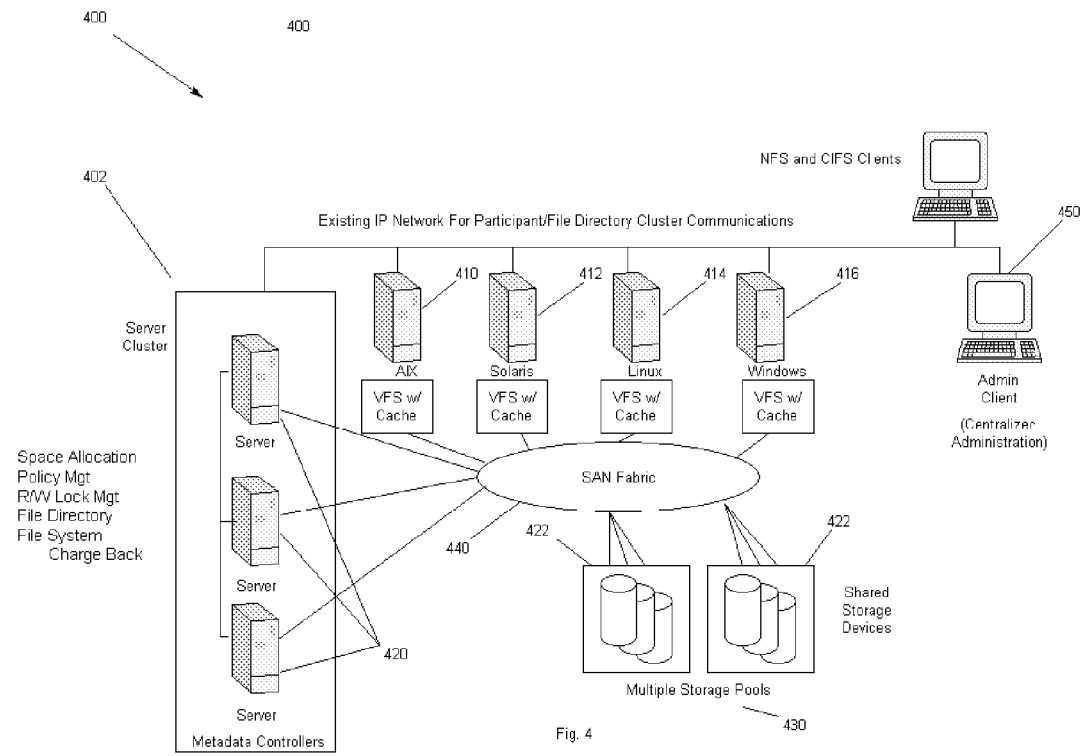
FIG. 4 illustrates a SAN that may be configured to provide a file system that provides file system charge-back accounting according to an embodiment of the present invention.

FIG. 4 illustrates a system 400 that may be configured to provide file system charge-back accounting according to an embodiment of the present invention. In FIG. 4, application, or client, servers 410-416, which request a file, obtain information about the file (the meta-data) from the servers 420 of the server cluster 402 that manages file locks and all other file information. The servers 420 then provide that information to the application, or client, servers 410-416. The application, or client, servers 410-416 then access the blocks comprising that file at the storage pools of the storage pools 430 directly through the SAN fabric 440.

A server 420 is designed to be implemented on a variety of operating systems, e.g., Windows to various flavors of Linux and UNIX, thereby allowing a server 420 and all of these operating systems to share files. In certain embodiments, server 420 may include a cluster of servers. For example, a file created in Windows will be as accessible from a Windows client, or application, server 416 as it is from Solaris 412, AIX 410, or any other supported platform, and vice versa. However, an application is still required to be able to read that file, no matter how accessible it is.

Since server 420 will have a complete understanding of all files managed by the server cluster 402, including the essential meta-data related to each file to make important decisions, a server 420 may be used to manage the storage on the network. A server 420 in server cluster 402 may be configured to provide space allocation control, policy management, read/write lock management, file directory and file system charge back records. Setting these policies relieves the storage administrator of the burden of repetitive tasks, and forms the basis of automation. Moreover, file system charge back accounting provided by embodiments of the present invention may manage user equivalence between operating systems.

A server 420 also provides the ability to group storage devices according to their characteristics, such as latency and throughput. These groupings, called storage pools 430, allow administrators to manage data according to predetermined characteristics. Because the meta-data for the server cluster 402 is separate from the application data, files can be manipulated while remaining active. When files are removed from service, the server cluster 402 may automatically reallocate the space without disruption. If a LUN is removed from the control of the server cluster 402, the data on that LUN can be automatically moved.

The server cluster 402 persistently maintains a record of space utilization as part of the file system's metadata information as users perform creation, allocation, deletion and ownership modification operations. A minimum and maximum space utilization is tracked per management object (user or group) for each reporting cycle. Optionally, time weighted averages can be generated based on real consumption over the reporting cycle. The charge-back feature can be integrated with other SAN configuration metadata to provide a resource aware pricing structure. For example, this could be accomplished by defining attributes of tiered storage when configuring pools and LUNs.

While the server 420 for controlling the metadata of the storage cluster 402 is shown in FIG. 4 as a separate entity, embodiments of the present invention are not meant to be limited to the use of a separate entity. Rather, the control provided by servers 420 may reside on any client, application, servers 410-416 in the network or even within a storage servers. Moreover, embodiments of the present invention are not meant to be limited to the storage architecture or hardware configuration illustrated in FIG. 4.

Figure 5:
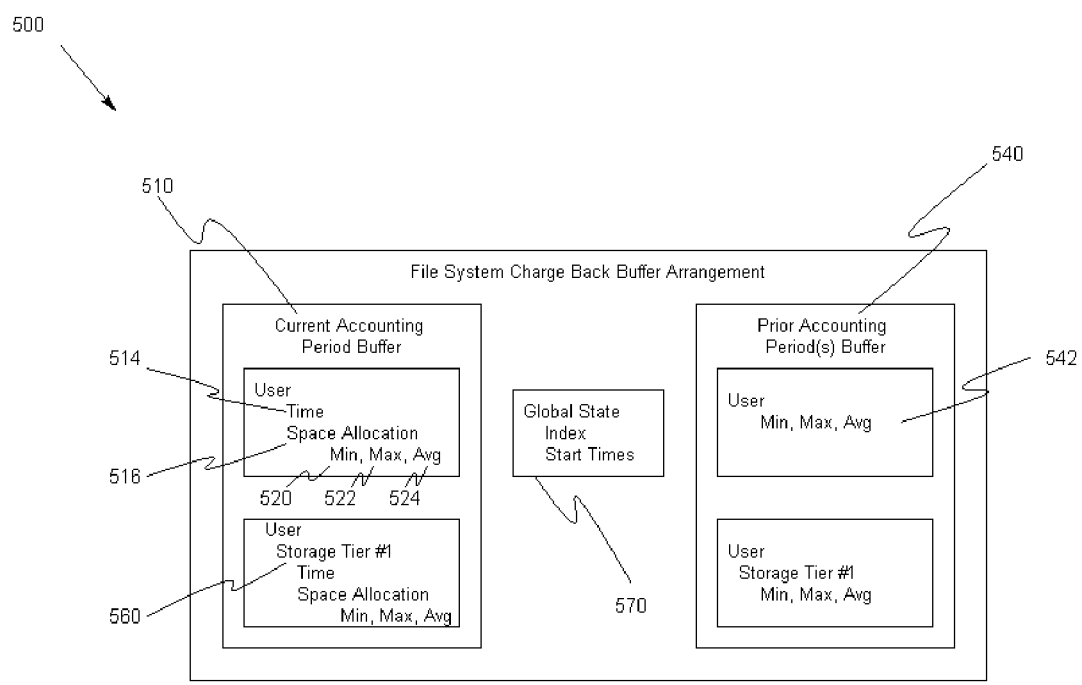
FIG. 5 illustrates a file system charge back buffer arrangement for providing a record of space utilization as part of a file system's metadata information according to an embodiment of the present invention.

FIG. 5 illustrates a file system charge back buffer arrangement 500 for providing a record of space utilization as part of a file system's metadata information according to an embodiment of the present invention. While a double buffer is illustrated in FIG. 5, those skilled in the art will recognize that the present invention is not meant to be limited to a double buffer arrangement. For example, multiple buffers may be used to provide records over a plurality of accounting periods or the buffers may be subdivided into memory areas for maintaining space utilization records over a plurality of accounting periods. Alternatively, a single buffer may be used. A single buffer would still allow real-time minimum, maximum, and average space allocation data to be maintained, but would not be able to report on it statically.

In FIG. 5, the double buffer configuration 500 includes a first buffer 510 and a second 540 buffer for transactionally and persistently maintaining the space allocation records. The first buffer 510 persistently maintains a record of space utilization data for the current accounting period. The current copy buffer 510 maintains the record that gets updated as the user allocates and deallocates space. Thus, the first buffer 510 is dynamic. The double buffer 500 for implementing the system charge-back function keeps track of the minimum 520, maximum 522, and average 524 bytes used per user during a customer defined accounting period.

The second buffer 540 persistently maintains a record of space utilization data for a previous accounting period. Because the space utilization data of the second buffer 540 is for a previous accounting period, the second buffer 540 is static. Accordingly, the double buffer system 500 stores two copies of the minimum space utilization, maximum space utilization, and average bytes used values. Further, once an accounting period ends, the record in the current buffer 510 is moved to a buffer for maintaining a previous accounting period. This move may be physical or logical. When only two buffers are used, the data in the previous accounting period buffer 540 may be overwritten with the data moved form the current buffer 510 when the move is physical. However, a new buffer may be configured for maintaining the data being moved. Still further, a new buffer may be configured for the current accounting period and the old current buffer modified to be the most recent previous accounting period buffer.

Using the space utilization data 542 for a user that is maintained in the second buffer 540, an administrator may generate accounting reports on space usage based on the stable values in the previous accounting period. The same report can be generated several times within the same accounting period and provide the exact same results since it isn't subject to the most recent changes in space usage.

Accordingly, a file system charge-back configuration 500 according to an embodiment of the present invention allows the administrator to define a charge-back accounting cycle and independent report generation. A global state 570 which includes an index and the start times for the current and previous accounting periods is maintained. At the start of a new accounting period the index for the global state 570 is incremented. The start time is saved. Thus, the system stores the start time of the current period and the previous period.

Once a new accounting cycle is defined, the minimum and maximum space utilized by each user is maintained for reporting until the next accounting cycle. The file system may maintain the current space utilization information in the current accounting period buffer 510 along with a number of other records of previous space utilization 540. Additionally, the charge-back data of the current copy buffer is maintained real time with file system activity regarding the time 514 and space allocation 516 to provide a more accurate space utilization report. Furthermore, cost constants can be applied to actual storage allocation to capture specific storage attributes such as quality of service, service level agreements, or tiered storage class.

In FIG. 5, a user's space allocation per storage tier 560 may also be maintained in a record. Thus, in a tiered storage file system, accounting information may be maintained for each user for each storage tier 560 as well as information for the user aggregated over all storage tiers. This allows an administrator to charge different amounts for the different storage tiers.

There are administrative commands to define and report on a charge-back accounting cycle. The reporting cycle is atomically set for all managed objects. A double buffering algorithm and period number are used in each persistent charge-back record to assist in maintaining the current and at least the most recent periods charge-back totals on-the-fly. If the space utilization isn't updated prior to a report being submitted, the correct results will be generated on-demand. Alternatively, a background thread may be used to maintain the charge-back table in real-time.

As an example, an administrator might start a new accounting period every day at midnight. The administrator can run the accounting report several times today to get yesterday's accounting information. Tomorrow, the administrator can run the accounting to get today's accounting information.

The concept of the minimum and maximum space used by a user may be calculated according to various methods. For example, if the user started the day using 1 GB, then allocated another 1 GB, and then at the end of the day deleted the 1 GB, the minimum would be 1 GB, and the maximum would be 2 GB. Accordingly, the average may be calculated to be 1.5 GB (the average of the minimum and maximum). However, this average is not very meaningful. A more meaningful average may be a weighted average, which takes into account the amount of time that the space was allocated.

One example of a weighted average space allocation may be calculated as follows:

$$\frac{12 \text{ hours} \times 1 \text{ GB} + 6 \text{ hours} \times 2 \text{ GB} + 6 \text{ hours} \times 1 \text{ GB}}{24 \text{ hours}} = 1.25 \text{ GB}. \quad \text{Eq. 1}$$

Equation 1 can be generalized to support an arbitrary number of allocations and deallocations in the accounting period. Equation 2 below shows a generalized average calculation, wherein the accounting period corresponds to a history of $space_i$, i.e., bytes allocated for a duration of $time_i$.

$$\text{Avg} = \frac{\sum space_i \times time_i}{\sum time_i}. \quad \text{Eq. 2}$$

The problem with Equation 2 is that it requires knowledge of all $space_i$ and $time_i$ at the end of the accounting period. However, the average value may be calculated incrementally. Table 1 shows an example of the state of the current accounting buffer 510 shown in FIG. 5 as allocation/deallocation events occur. The current time is relative to the beginning of the accounting period.

TABLE 1

Incremental Accounting Updates

| External Events | | | Current Accounting Buffer | | | | |
|---|---|---|---|---|---|---|---|
| Event Number | Current Time | Space Change | Time | Space | Min | Max | Avg |
| 1 | 0 | +1 GB | 0 | 1 GB | 1 GB | 1 GB | 0 |
| 2 | 12 Hrs | +1 GB | 12 Hrs | 2 GB | 1 GB | 2 GB | 1 GB |
| 3 | 18 Hrs | −1 GB | 18 Hrs | 1 GB | 1 GB | 2 GB | 1.33 GB |
| 4 | 24 Hrs | 0 | 24 Hrs | 1 GB | 1 GB | 2 GB | 1.25 GB |

The table depicts the state of the current accounting buffer after it has been updated as a result of the event. Note that the average lags one event behind; in other words it does not include the 1 GB that was allocated at event number 1 since at the time of the update, that space has been held for no time. The initial value for average at the first event will be the value of space allocation at the beginning of the accounting period (in this example, 0). At the second event the average is updated to include the 1 GB by the formula shown in Equation 3:

$$CurrentAvg = \frac{Time \times Avg + (CurrentTime - Time) \times Space}{CurrentTime}. \quad \text{Eq. 3}$$

In Equation 3, the variables Time, Avg, and Space on the right hand side correspond to the state of the current buffer prior to any updates for this event. Substituting in the values, for the second event results in the calculation:

$$\text{Avg} = \frac{0 \times 0 + (12 \text{ hours} - 0) \times 1 \text{ GB}}{12 \text{ hours}} = 1 \text{ GB}. \quad \text{Eq. 4}$$

Therefore after the second event, the average is 1 Gb. The value of the average calculated for the third event is calculated incrementally as:

$$\text{Avg} = \quad \text{Eq. 5}$$
$$\frac{12 \text{ hours} \times 1 \text{ GB} + (18 \text{ hours} - 12 \text{ hours}) \times 2 \text{ GB}}{18 \text{ hours}} = 1.33 \text{ GB}.$$

Finally at the fourth event, the final average value for the accounting period is computed as:

$$\text{Avg} = \frac{18 \text{ hours} \times 1.33 \text{ GB} + (24 \text{ hours} - 18 \text{ hours}) \times 1 \text{ GB}}{24 \text{ hours}} = 1.25 \text{ GB}. \quad \text{Eq. 6}$$

The fourth event is the first event following the beginning of a new accounting period. At this time, the average will be updated to include the current space used for the remaining time left in the accounting period. This is accomplished by using the end time of the accounting period as the current time when evaluating Equation 3. Once the average has been updated, the contents of the current accounting period buffer 510 as shown in FIG. 5 will be copied to the prior accounting period(s) buffer 542. In addition, after copying the current buffer to the prior accounting period(s) buffer, the current buffer will be initialized by setting the Min, Max, and Avg to Space Allocation 516, and setting the Time 514 to the time that the accounting period began. The fourth event, and its corresponding incremental update to the accounting buffer takes place when either an accounting report is generated or space is allocated or deallocated.

Figure 6:
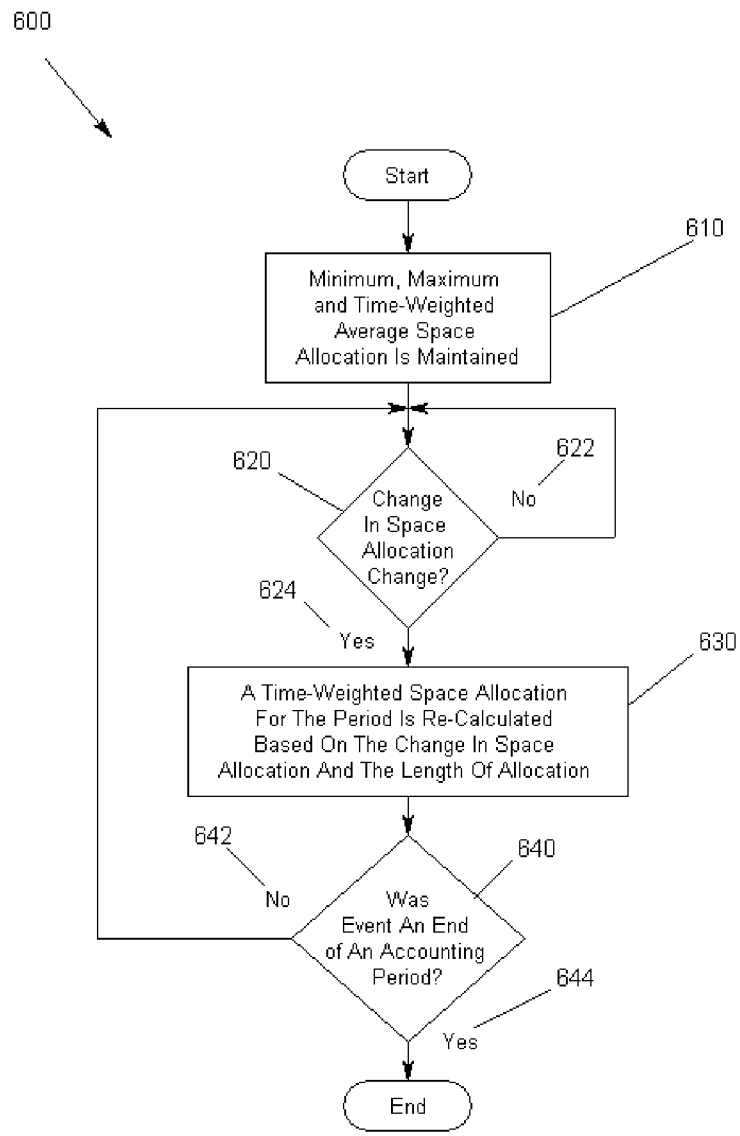
FIG. 6 is a flow chart showing the method for calculating a weighted average of space allocation according to an embodiment of the present invention.

FIG. 6 is a flow chart 600 showing a method for calculating a time-weighted average of space allocation according to an embodiment of the present invention. The value representing a maximum space allocation, a minimum space allocation and a time-weighted average for space allocation are maintained 610 The system waits for a change in space allocation 620. If a change is space allocation does not occur 622, the system continues to monitor the space allocation. If the space allocation changes 624, a time-weighted average of space allocation is re-calculated based on the change in space allocation and the length of allocation 630. The system then waits for another change. For example, an event that represents a change may be the end of an accounting period. Thus, at the end of an accounting period, the time-weighted average may be re-calculated as shown in FIG. 6. A determination is made whether the last even was the end of an accounting period 640. If not, the system continues to maintain and update the space allocation data 642. If the last even was the end of an accounting period 644, the process ends. The space allocation data may then be provided to an accounting system.

A file system according to an embodiment of the present invention tracks accounting information directly. While some file systems track quota information, such file systems simply allow the current number of bytes used to be determined without being able to providing file system chargeback accounting with real time historical minimum and maximum usage per management object according to an embodiment of the present invention. Further, such file systems must be polled periodically to produce estimates of the minimum, maximum, and average space usage. The benefit of storing and maintaining the accounting information directly within the file system is that the exact minimum, maximum, and average space usage can be determined without the cost of periodically polling the current usage.

An accounting period may be defined as including a start date and time and an end date and time, wherein the period is designated as $P=<T_{start}, T_{end}>$. Over the history of the file system, several accounting periods may occur, denoted as $<T_0, T_1>$, $<T_1, T_2>$, $<T_2, T_3>$, . . . , $<T_{N-1}, T_N>$, and $<T_N, T_{now}>$. The end timestamp for one accounting period is the start timestamp for the next accounting period. The last accounting period has an end timestamp of $T_{now}$, which indicates that the accounting period is current. In general, for any completed accounting period $P_i$, the timestamps are $<T_{i-1}, T_i>$. A file system according to an embodiment of the present invention maintains a history of at least two accounting periods, the current period $P_{now}$ and at least one previous period. However, a file system according to another embodiment of the present invention may be configured to maintain a longer history, which may include a plurality of previous accounting periods. The history of the accounting periods can be stored persistently using variables that are part of a larger structure that describes the file system.

Figure 7:
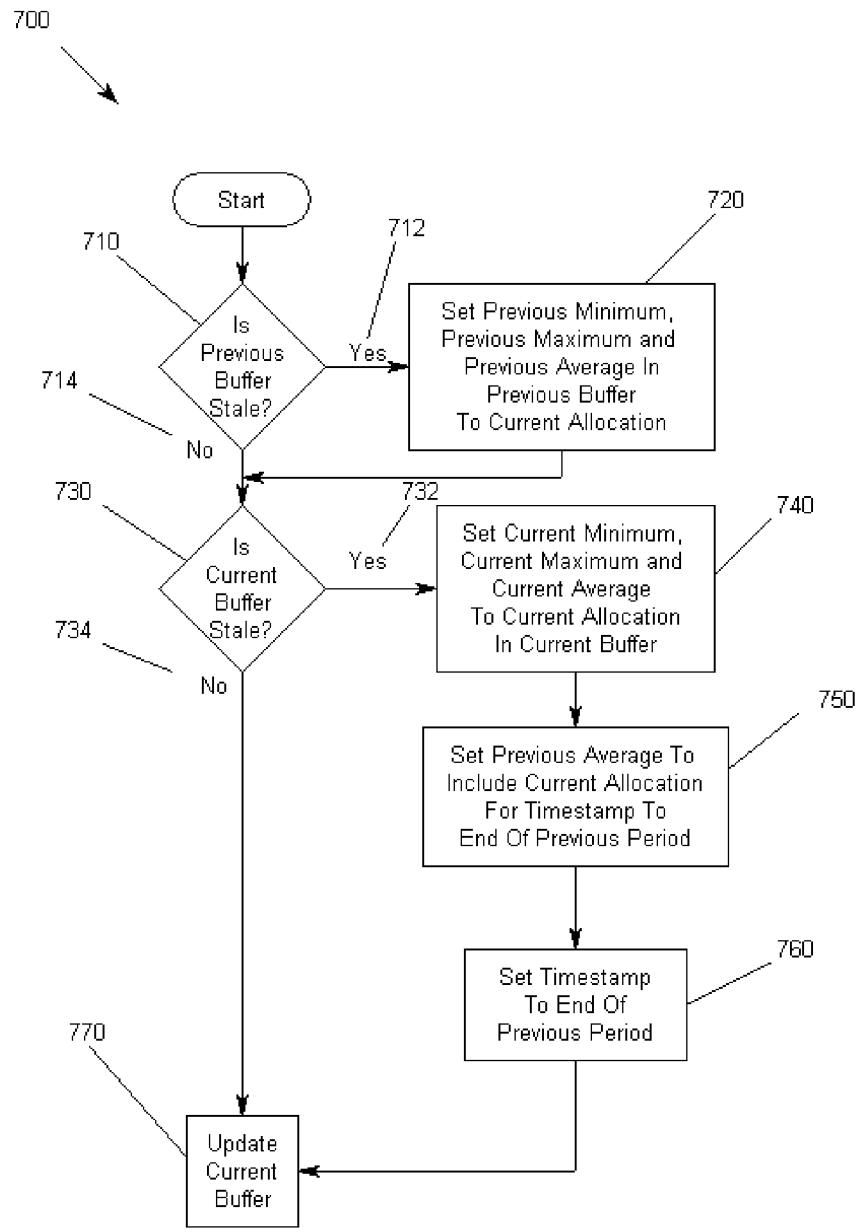
FIG. 7 is a flow chart showing the method for managing the content buffers relative to changes in accounting periods.
Figure 8:
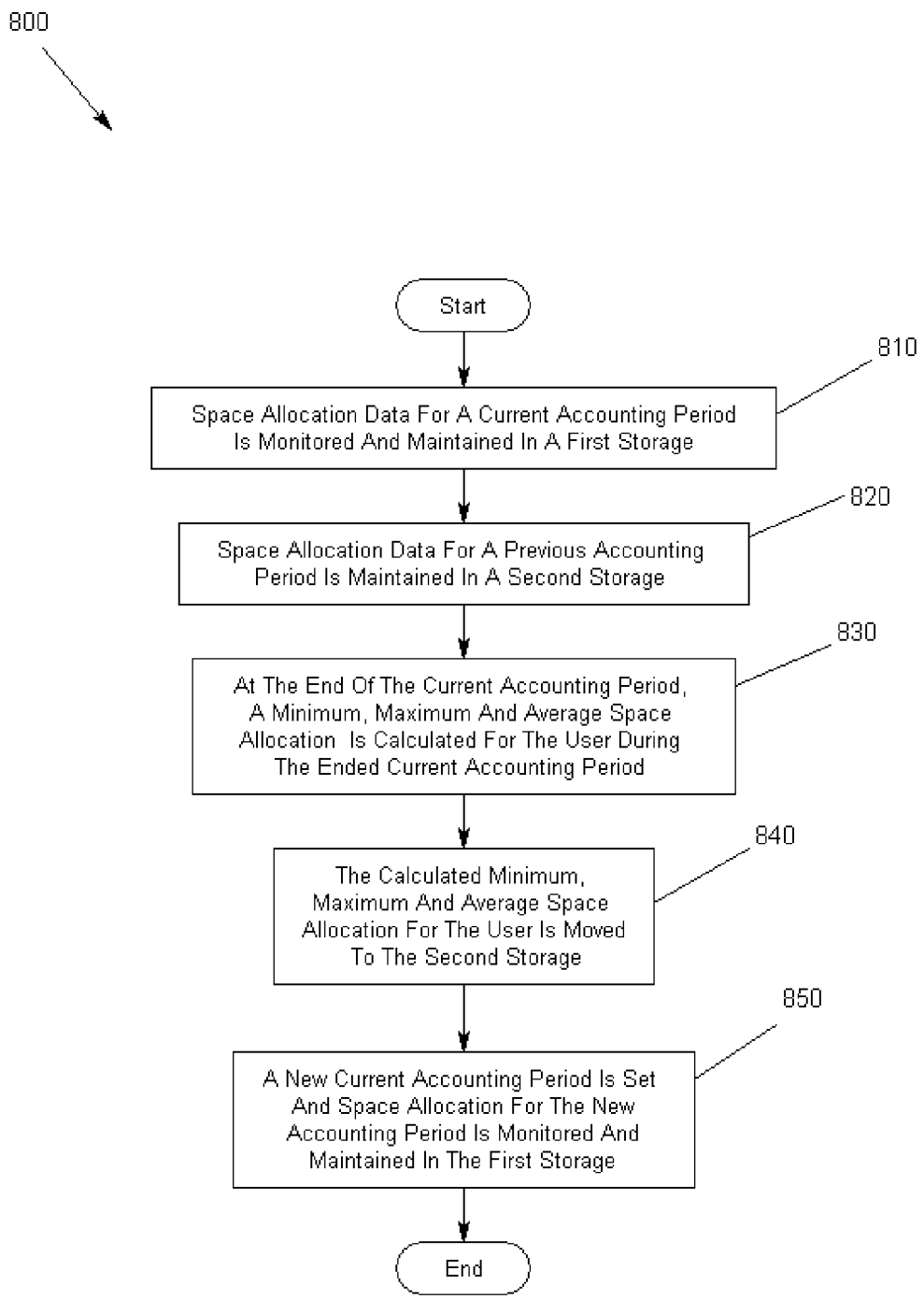
FIG. 8 is a flow chart showing the method for providing file system chargeback accounting according to an embodiment of the present invention.

FIG. 7 is a flow chart 700 of the method for managing the content of the buffers relative to changes in accounting periods according to an embodiment of the present invention. In FIG. 7, a determination is made whether the content of the buffer for the previous accounting period is stale 710 (correct?). When updating the accounting information, the start of a new accounting period is noted. The accounting record for each user may have its own local copy of the global index. If the local copy is different than the global, then the accounting record represents a previous accounting period. If the local copy is off by one, the previous buffer is stale 712 and then the minimum, maximum, and average for the new previous buffer is set to the current space usage 720. If the previous buffer is not stale 714, or after the minimum, maximum, and average for the new previous buffer is set to the current space usage, a determination is made whether the current buffer is stale 730. If the local copy of the global index is different from the global index by one or more, then the current buffer is stale 732. The minimum, maximum, and average for the new current buffer is set to the current space usage 740, the average for the new previous buffer is set to include the current space usage for the remainder of the finished accounting period 750. Then, the timestamp is set to end of previous period so that the update time to the start of the accounting period is set 760. If the current buffer is not stale 734, or after the accounting period is set 760, the current buffer is updated 770. Accordingly, when the local index is off by two or more, then both buffers are stale FIG. 8 is a flow chart 800 of the method for providing file system chargeback accounting according to an embodiment of the present invention. Space allocation data for a current accounting period is monitored and maintained in a first storage 810. Space allocation data for a previous accounting period is maintained in a second storage 820 At the end of the current accounting period, a minimum, maximum and average space allocation is calculated for the user during the ended current accounting period 830. The calculated minimum, maximum and average space allocation for the user is moved to the second storage 840. This move may be physical or logical. A new current accounting period is set and space allocation for the new accounting period is monitored and maintained in the first storage 850.

Figure 9:
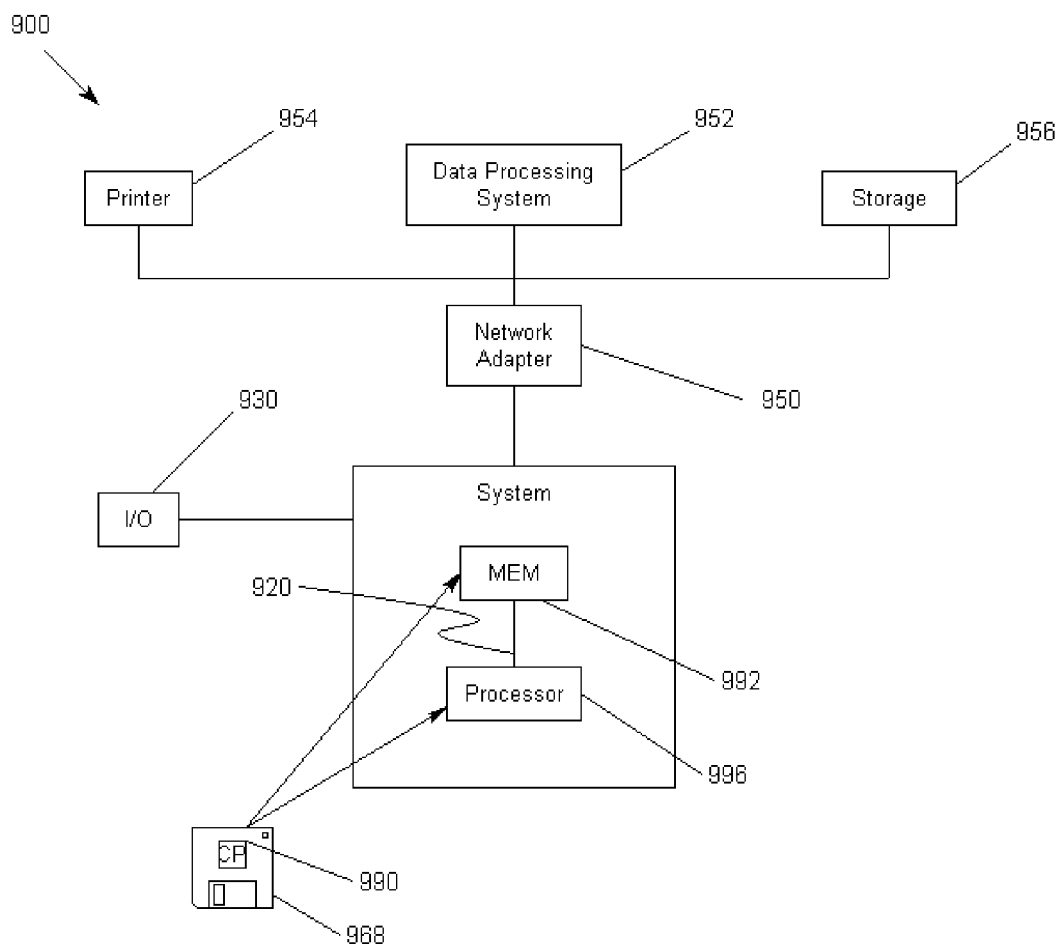
FIG. 9 illustrates a system according to an embodiment of the present invention.

FIG. 9 illustrates a system 900 according to an embodiment of the present invention. Embodiments of the present invention may take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 990 accessible from a computer-usable or computer-readable medium 968 providing program code for use by or in connection with a computer or any instruction execution system.

For the purposes of this description, a computer-usable or computer readable medium 968 can be any apparatus that can contain, store, communicate, propagate, or transport the program for use by or in connection with the instruction execution system, apparatus, or device. The medium 968 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A system suitable for storing and/or executing program code will include at least one processor 996 coupled directly or indirectly to memory elements 992 through a system bus 920. The memory elements 992 can include local memory employed during actual execution of the program code, bulk storage, and cache memories which provide temporary storage of at least some program code in order to reduce the number of times code must be retrieved from bulk storage during execution.

Input/output or I/O devices 930 (including but not limited to keyboards, displays, pointing devices, etc.) can be coupled to the system either directly to the system or through intervening I/O controllers.

Network adapters 950 may also be coupled to the system to enable the system to become coupled to other data processing systems 952, remote printers 954 or storage devices 956 through intervening private or public networks 960 (not shown). Modems, cable modem and Ethernet cards are just a few of the currently available types of network adapters.

Accordingly, the computer program 990 comprise instructions which, when read and executed by the system 900 of FIG. 9, causes the system 900 to perform the steps necessary to execute the steps or elements of the present invention The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A storage system, comprising:
    a processor in communication with a pool of storage;
    a controller, coupled to the pool of storage, for controlling user access to the storage pool;
    a first file system buffer to persistently maintain actual space allocation data for each event during a current accounting period, and calculate allocation data derived from the actual space allocation data comprising a minimum, a maximum and a weighted average space allocation calculated based upon the actual space allocation data for a management object during the current accounting period; and
    the processor to re-calculate said calculated allocation data in response to an event selected from the group consisting of: an allocation event and a deallocation event;
    wherein the weighted average space allocation associated with the event is incrementally calculated based upon the weighted average space allocation associated with a previous event, factors of time, and a current event allocation space, absent directly using actual space allocation data associated with all previous events.

2. The storage system of claim 1, wherein the actual space allocation data is transactionally and persistently maintained per management object.

3. The storage system of claim 2, wherein the actual space allocation data per management object is maintained per storage tier.

4. The storage system of claim 1, wherein the average space allocation comprises an average that is weighted based on lengths of time and size of space allocation during the current accounting period.

5. The storage system of claim 1, wherein space allocation data in the first file system buffer is updated as space is allocated and deallocated.

6. The storage system of claim 1, further comprising an accounting system that applies cost constants to the space allocation data.

7. The storage system of claim 1, further comprising a second file system buffer for persistently maintaining space allocation data for a previous accounting period, wherein the space allocation data persistently maintained during the first accounting period is moved to the second file system buffer at the end of the current accounting period.

8. A program storage device, comprising:
    program instructions executable by a processing device to perform operations for providing file system average allocation data, the operations comprising:
    monitoring and persistently maintaining, in a first storage area of file system memory, actual space allocation data for a current accounting period, and calculating allocation data derived from the actual space allocation data comprising a minimum, a maximum and a weighted average space allocation calculated based upon the actual space allocation data;
    re-calculating said calculated allocation data in response to an event selected from the group consisting of: an allocation event and a deallocation event;
    wherein the weighted average space allocation associated with the event is incrementally calculated based upon the weighted average space allocation associated with a previous event, factors of time, and a current event allocation space, absent directly using actual space allocation data associated with all previous events.

9. The program storage device of claim 8, wherein calculating a minimum, maximum and average space allocation further comprises calculating an average that is weighted based on
    lengths of time and size of space allocation during the current accounting period based upon a formula $$CurrentAvg = \frac{Time \times Avg + (CurrentTime - Time) \times Space}{CurrentTime}.$$

10. The program storage device of claim 8, wherein the monitoring and persistently maintaining, in a first storage area of file system memory, space allocation data for a current accounting period further comprises transactionally and persistently maintaining space allocation data per management object.

11. The program storage device of claim 8, wherein the monitoring and persistently maintaining, in a first storage area of file system memory, space allocation data for a current accounting period further comprises updating the space allocation data as space is allocated and deallocated.

12. The program storage device of claim 8 further comprising:
    persistently maintaining space allocation data for a previous accounting period in a second storage area of the file system memory; and
    moving the maintained space allocation for the management object to the second storage area of the file system memory while beginning to monitor and persistently maintain space allocation data of the management object in the first storage area of the file system memory during a subsequent accounting period.

13. A method for providing file system average allocation data, comprising:
monitoring and persistently maintaining, by a processing unit, in a first storage area of file system memory, space allocation data for a current accounting period, and calculating allocation data derived from the space allocation data comprising a minimum, a maximum and an average space allocation calculated based upon the actual space allocation data;
re-calculating, by the processing unit, said calculated allocation data in response to an event selected from the group consisting of: allocation event and deallocation event;
wherein the average space allocation associated with the event is an incremental calculation based upon the average space allocation associated with a previous event, factors of time, and a current event allocation space, absent directly using actual space allocation data associated with all previous events.

* * * * *